(12) United States Patent
Ling

(10) Patent No.: US 10,494,913 B2
(45) Date of Patent: Dec. 3, 2019

(54) EARTH FORMATION CRUSHING MODEL

(71) Applicant: Halliburton Energy Services, Inc., Houston, TX (US)

(72) Inventor: Xianwu Ling, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 177 days.

(21) Appl. No.: 15/509,922

(22) PCT Filed: Nov. 20, 2014

(86) PCT No.: PCT/US2014/066673
§ 371 (c)(1),
(2) Date: Mar. 9, 2017

(87) PCT Pub. No.: WO2016/081001
PCT Pub. Date: May 26, 2016

(65) Prior Publication Data
US 2017/0248007 A1    Aug. 31, 2017

(51) Int. Cl.
*E21B 47/06*    (2012.01)
*E21B 10/00*    (2006.01)
*E21B 44/00*    (2006.01)
*E21B 12/02*    (2006.01)
*G06F 17/50*    (2006.01)

(52) U.S. Cl.
CPC ............. *E21B 47/06* (2013.01); *E21B 10/00* (2013.01); *E21B 12/02* (2013.01); *E21B 44/00* (2013.01); *G06F 17/5009* (2013.01); *G06F 17/5086* (2013.01)

(58) Field of Classification Search
CPC .......... E21B 47/06; E21B 10/00; E21B 44/00; G06F 17/5009; G06F 17/5086
USPC .......................................................... 703/7
See application file for complete search history.

(56) References Cited

U.S. PATENT DOCUMENTS

| 4,697,650 A |   | 10/1987 | Fontenot |           |
|---|---|---|---|---|
| 4,815,342 A | * | 3/1989  | Brett    | B23P 15/28 |
|             |   |         |          | 700/159   |
| 4,852,399 A |   | 8/1989  | Falconer |           |

(Continued)

FOREIGN PATENT DOCUMENTS

| WO | WO-2008101285 A1 * | 8/2008 | ............. E21B 10/00 |
|---|---|---|---|
| WO | 2010039342 A1 | 4/2010 | |
| WO | 2016081001 A1 | 5/2016 | |

*Primary Examiner* — Kamini S Shah
*Assistant Examiner* — Iftekhar A Khan
(74) *Attorney, Agent, or Firm* — Alan Bryson; Parker Justiss, P.C.

(57) ABSTRACT

A method includes receiving, at a computer, an Earth formation characteristic and a cutter characteristic of a cutter of an Earth drill bit and determining, with the computer, a cutting characteristic at an interface between the Earth formation and the cutter based on the Earth formation characteristic and the cutter characteristic using an Earth formation crushing model operating on the computer. The Earth formation crushing model includes an empirical determination of stress at the interface in a first of three mutually perpendicular axes and determinations of stress in the remaining two mutually perpendicular axes that are mathematical functions based on the empirical determination of stress. The method also includes outputting the determined cutting characteristic.

17 Claims, 7 Drawing Sheets

(56) References Cited

U.S. PATENT DOCUMENTS

| | | | |
|---|---|---|---|
| 4,991,671 A * | 2/1991 | Pearce | E21B 10/20 175/369 |
| 5,216,917 A | 6/1993 | Detournay | |
| 5,377,116 A * | 12/1994 | Wayne | G05B 19/4097 700/175 |
| 5,377,773 A * | 1/1995 | Tibbitts | E21B 10/43 175/397 |
| 5,415,030 A | 5/1995 | Jogi et al. | |
| 5,787,022 A * | 7/1998 | Tibbitts | E21B 10/43 702/12 |
| 6,213,225 B1 * | 4/2001 | Chen | E21B 10/08 175/331 |
| 6,389,360 B1 * | 5/2002 | Alft | E21B 7/04 702/9 |
| 6,612,382 B2 | 9/2003 | King | |
| 7,085,696 B2 | 8/2006 | King | |
| 7,334,652 B2 * | 2/2008 | Chen | E21B 10/08 175/374 |
| 7,726,415 B1 * | 6/2010 | Tipton | E21B 10/26 175/385 |
| 7,991,554 B2 | 8/2011 | Calhoun et al. | |
| 8,150,667 B2 * | 4/2012 | Ledgerwood, III | E21B 10/00 703/7 |
| 8,185,366 B2 * | 5/2012 | Huang | E21B 44/00 175/39 |
| 8,274,399 B2 * | 9/2012 | Strachan | G05B 13/048 340/853.6 |
| 9,404,312 B2 * | 8/2016 | Azar | E21B 10/26 |
| 10,119,337 B2 * | 11/2018 | Ling | E21B 10/42 |
| 2003/0034176 A1 * | 2/2003 | Singh | E21B 10/16 175/57 |
| 2003/0111267 A1 * | 6/2003 | Pia | E21B 10/345 175/57 |
| 2004/0254664 A1 * | 12/2004 | Centala | E21B 10/00 700/97 |
| 2005/0015229 A1 * | 1/2005 | Huang | E21B 10/00 703/10 |
| 2005/0080595 A1 * | 4/2005 | Huang | E21B 10/00 702/183 |
| 2005/0096847 A1 * | 5/2005 | Huang | E21B 10/16 702/9 |
| 2005/0133272 A1 * | 6/2005 | Huang | E21B 10/00 175/327 |
| 2005/0154568 A1 * | 7/2005 | Huang | E21B 10/16 703/7 |
| 2006/0041411 A1 * | 2/2006 | Yong | E21B 44/00 703/10 |
| 2006/0162968 A1 * | 7/2006 | Durairajan | E21B 10/43 175/431 |
| 2006/0167668 A1 * | 7/2006 | Cariveau | E21B 10/00 703/7 |
| 2006/0167669 A1 * | 7/2006 | Cariveau | E21B 10/00 703/7 |
| 2006/0180356 A1 * | 8/2006 | Durairajan | E21B 10/42 175/431 |
| 2007/0078632 A1 * | 4/2007 | Shen | E21B 10/43 703/1 |
| 2007/0175669 A1 * | 8/2007 | Liang | C22C 29/08 175/374 |
| 2007/0185696 A1 * | 8/2007 | Moran | E21B 44/00 703/10 |
| 2007/0256862 A1 * | 11/2007 | Lund | G01N 29/04 175/39 |
| 2008/0029308 A1 * | 2/2008 | Chen | E21B 10/16 175/331 |
| 2008/0262810 A1 * | 10/2008 | Moran | E21B 7/00 703/10 |
| 2010/0155148 A1 * | 6/2010 | Choe | B22D 19/06 175/426 |
| 2010/0206640 A1 * | 8/2010 | Lockwood | C22C 29/08 175/374 |
| 2010/0211362 A1 * | 8/2010 | Huang | E21B 10/00 703/1 |
| 2010/0259415 A1 * | 10/2010 | Strachan | E21B 44/00 340/853.6 |
| 2010/0329081 A1 * | 12/2010 | Sullivan | E21B 10/00 367/120 |
| 2011/0035200 A1 * | 2/2011 | Huang | E21B 10/00 703/6 |
| 2011/0240376 A1 * | 10/2011 | Chen | E21B 10/43 175/336 |
| 2012/0152624 A1 * | 6/2012 | Chen | E21B 10/43 175/428 |
| 2013/0068534 A1 * | 3/2013 | DiGiovanni | E21B 10/5673 175/428 |
| 2014/0110181 A1 * | 4/2014 | Zhang | E21B 10/55 175/428 |
| 2014/0299315 A1 * | 10/2014 | Chuprakov | E21B 43/26 166/250.1 |
| 2015/0259988 A1 * | 9/2015 | Chen | E21B 10/5673 175/430 |
| 2016/0326808 A1 * | 11/2016 | Ansari | E21B 10/43 |

\* cited by examiner

EARTH FORMATION CRUSHING MODEL

CROSS-REFERENCE TO RELATED APPLICATION

This application is the National Stage of, and therefore claims the benefit of, International Application No. PCT/US2014/066673 filed on Nov. 20, 2014, entitled "EARTH FORMATION CRUSHING MODEL," which was published in English under International Publication Number WO 2016/081001 on May 26, 2016. The above application is commonly assigned with this National Stage application and is incorporated herein by reference in its entirety.

BACKGROUND

The present disclosure relates to modeling the interaction between Earth drill bit cutters and an Earth formation, and more particularly to crushing models.

An Earth formation, or rock, fails by crushing, shearing, or chipping when cutting elements of an Earth drill bit engage the Earth formation. In some instances, when a depth of cut of a cutter of an Earth drill bit is shallow or for soft formations, an Earth formation fails primarily by crushing. Single cutter modeling is often used as the basis for modeling the interaction between an Earth drill bit and an Earth formation. 2D crushing models for a single cutter are often used to empirically predict cutting forces on a cutter for a variety of rock formations.

DESCRIPTION OF DRAWINGS

Like reference symbols in the various drawings indicate like elements.

DETAILED DESCRIPTION

The present disclosure relates to modeling an interaction between Earth drill bit cutters and an Earth formation, and more particularly to crushing models for fixed drill bit cutters. Rather than an entirely empirical model, the concepts herein encompass a model that implements a hybrid of empirical and analytical determinations of stress at the cutter front (i.e., the interface between the Earth drill bit cutter(s) and the Earth formation). In certain instances, the model is based on an empirical determination of stress at the interface between the cutter and the Earth formation in a first of three mutually perpendicular axes and determinations of stress at the interface in the remaining two mutually perpendicular axes that are mathematical functions based on the empirical determination of stress. In certain instances, the mathematical functions determining stress in the remaining two mutually perpendicular axes are first principle relationships between the stress in the first axis and the stresses in the remaining two axes.

Figure 1:
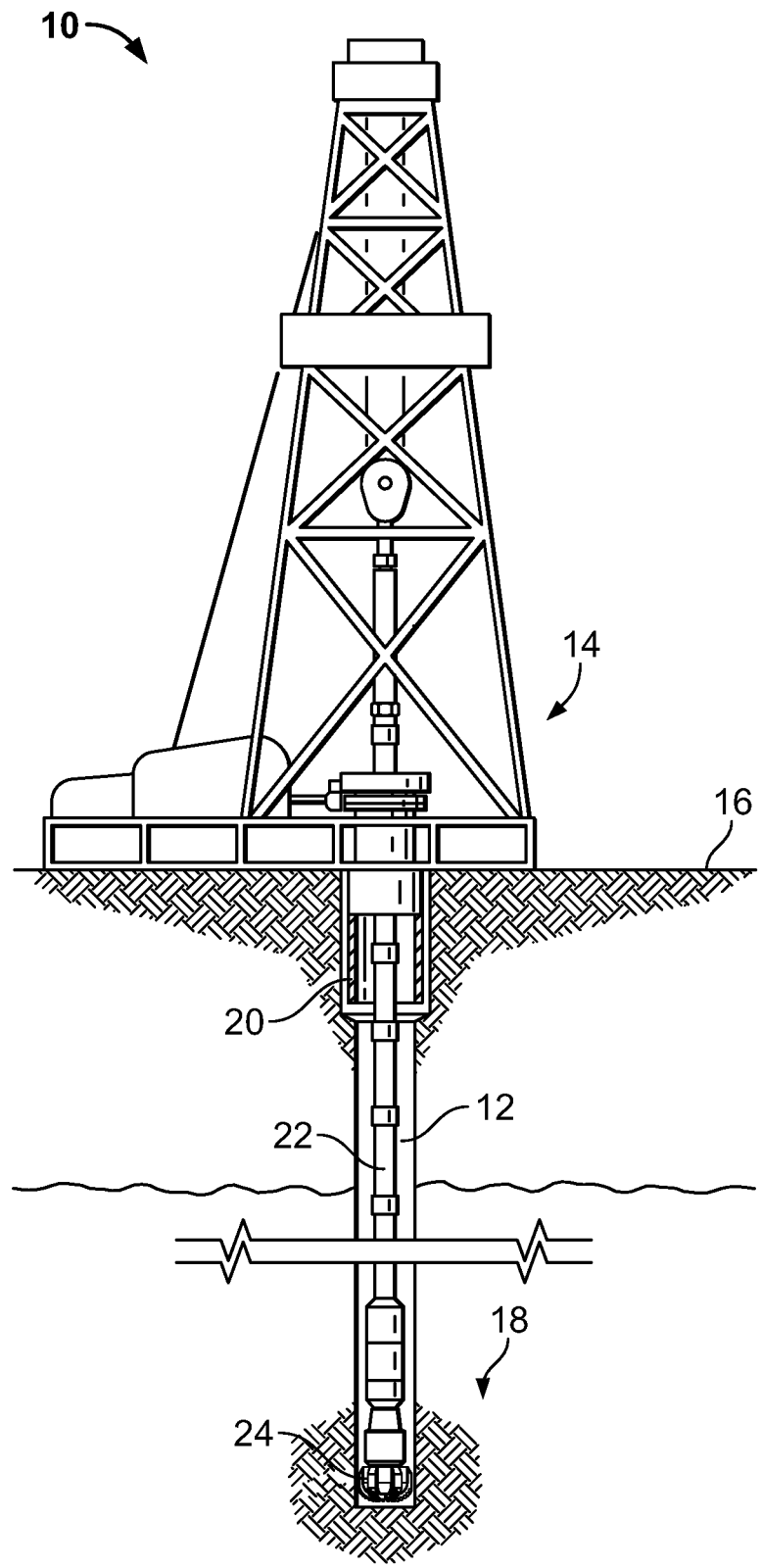
FIG. 1 is a schematic partial cross-sectional view of an example well system.

FIG. 1 is a schematic partial cross-sectional view of an example well system 10 that generally includes a substantially cylindrical wellbore 12 being drilled, extending from a wellhead 14 at the surface 16 downward into the Earth into one or more subterranean zones of interest (one subterranean zone of interest 18 shown). The subterranean zone 18 can correspond to a single formation, a portion of a formation, or more than one formation accessed by the well system 10, and a given well system 10 can access one, or more than one, subterranean zone 18. After some or all of the wellbore 12 is drilled, a portion of the wellbore 12 extending from the wellhead 14 to the subterranean zone 18 is lined with lengths of tubing, called casing 20. The depicted well system 10 is a vertical well, with the wellbore 12 extending substantially vertically from the surface 16 to the subterranean zone 18. The concepts herein, however, are applicable to many other different configurations of wells, including horizontal, slanted or otherwise deviated wells, and multilateral wells with legs deviating from an entry well.

A drill string 22 is shown as having been lowered from the surface 16 into the wellbore 12. In some instances, the drill string 22 is a series of jointed lengths of tubing coupled together end-to-end and/or a continuous (i.e., not jointed) coiled tubing. The drill string 22 includes one or more well tools, including a bottom hole assembly 24. The bottom hole assembly 24 can include, for example, an Earth drill bit. In the example shown, the wellbore 12 is being drilled by the Earth drill bit. The wellbore 12 can be drilled in stages, and the casing 20 may be installed between stages.

Figure 2:
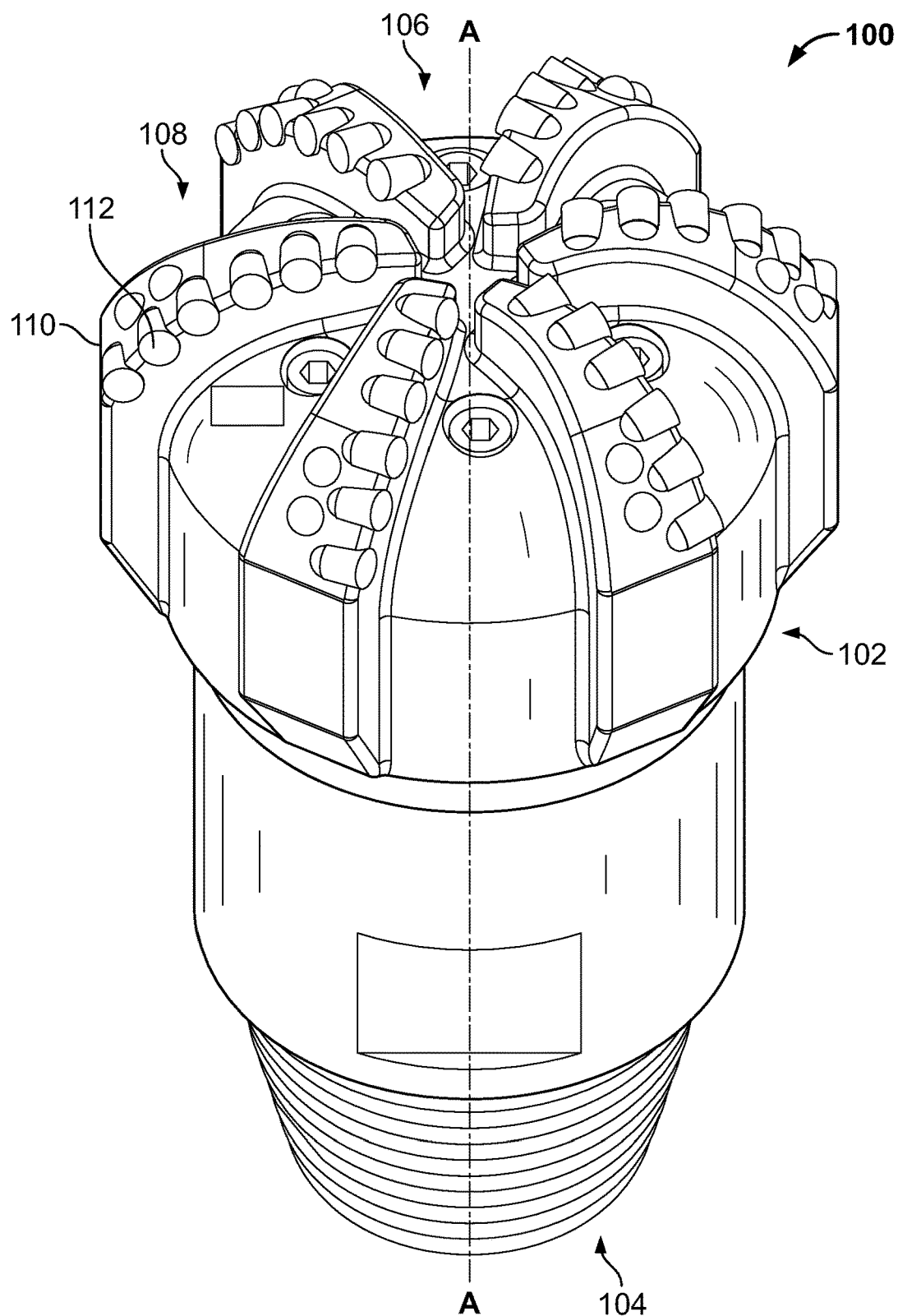
FIG. 2 is a schematic perspective view of an example drill bit.

FIG. 2 is a schematic perspective view of an example drill bit 100 that can be used in the bottom hole assembly 24 of the well system 10 of FIG. 1. The example drill bit 100 includes a bit body 102 with a pin end 104 on one longitudinal end of the bit body 102, a drill end 106 on another longitudinal end of the bit body 102 opposite the pin end 104, and a central bit body axis A-A. The central bit body axis A-A defines a central longitudinal axis through the center of the bit body 102. The drill bit 100 is rotated about the central bit body axis A-A while drilling. In some instances, the pin end 104 is male and is threaded to mate with a female box at a tubing end of a drill string. The example drill bit 100 includes cutting elements 108 in the form of cutters 112 on fixed (relative to the bit body 102) blades 110. The blades 110 extend longitudinally forward from the drill end 106 of the bit body assembly 102 with the cutters 112 partially embedded in the blades 110. Although FIG. 2 depicts the cutting elements 108 as circular cutters 112 on blades 110, the cutting elements 108 can include additional or different features and components. For example, the cutting elements 108 can include cutters of a different shape (e.g., rectangular, circular with a dull, flat end, and/or other), milled teeth, PDC inserts, carbide inserts, and/or other on roller cones, discs, and/or other cutting structures carried by the bit body 102. The cutters 112 engage an Earth formation in crushing and/or chipping during drilling, and experience cutting forces, cutter stresses at a surface of the cutters 112, and other factors acting on the cutters 112. The forces and stresses at the surface of the cutters 112 correspond to forces and stresses experienced by the Earth formation at the interface between the cutters 112 and the Earth formation. Thus, in certain instances, modeling the stresses at the surface of the cutters 112 (i.e., cutter faces) can predict cutting forces based on an Earth formation, cutter angles, cutting speed, depth of cut (DOC), and/or other factors. In some instances, modeling the stresses at the surface of the cutters 112 can predict a rate of penetration (ROP) of a drill bit (e.g., example drill bit 100) based on a weight on bit (WOB), rotational speed (RPM), Earth formation, and/or cutter angles.

Bit/rock interaction modeling aims to establish a relationship between the cutting forces, rock mechanical properties, cutting process parameters, and bit parameters, for example, in bit design and optimization, and drilling operations. Single cutter modeling is the basis of full scale bit/rock interaction. A cutter model distinguishes the breakage mode of the rock, namely, by crushing or shearing, or in other words, by ductile or brittle failure. Rock is plastically deformed and crushed at a tooth apex or cutter apex. Some analytical models for cutting force prediction are based on static chipping of the rock. In some instances, shearing or chipping failure predominates as the depth of cut or rock strength increases. However, with decreasing DOC or rock strength, crushing predominates, in which case $$F_n = \sigma_c A_c, \quad (1)$$

where $F_n$ is the applied force normal to the cutter face, $\sigma_c$ is the averaged contact stress, and $A_c$ is the cutter/rock contact area. In the simplest form, $\sigma_c$ is taken as the unconfined compressive strength (UCS) of rock. In some instances, the mechanical specific energy (MSE) under atmospheric conditions is close to the UCS. However, under pressurized conditions, the measured MSE can be much higher than the confined compressive strength. The MSE can be affected by confining pressure, back rake angle, $\theta$, of a respective cutter, and the DOC.

This linear relation between $F_n$ and A has been exploited and extended in many ways. For example, a phenomenological model by Detournay can take the form of $$F_s^c = \varepsilon A, \quad (2)$$

where $F_s^c$ is the drag force, the horizontal component of the cutting force, and $\varepsilon$ is defined as the intrinsic specific energy. However, $\varepsilon$ is not an intrinsic material property of rock. Even for shallow DOC, cutter profiles affect the cutting forces, so 3D cutting process should be modeled.

The stress state can affect the instantaneous rock strength, which, in turn, determines the force response. The crushing model includes a bottom-up approach, for example, by assuming the stress in rock at a cutter front and back-analyzing a parameter of the assumed stress using laboratory and/or experimental data. An Earth formation characteristic and a cutter characteristic of a cutter of an Earth drill bit are used to determine a cutting characteristic at an interface between the Earth formation and the cutter (i.e., the surface of the cutter) using an Earth formation crushing model. The Earth formation crushing model includes an empirical determination of stresses at the cutter front. The empirical determination of stresses at the cutter front can include an empirical determination of stress in a first of three mutually perpendicular axes and determinations of stress in the remaining two mutually perpendicular axes that are mathematical functions based on the empirical determination of stress.

Stress-based rock failure criteria are typically represented as a failure line or surface in the space of principal stresses in 2D or 3D. The rock strength is not a material constant, but is influenced by (e.g., decided by) an applied stress level. The minimum or maximum principle stress can be used to determine the failure point, and vice versa. In selecting a criterion for analyzing rock failure, it may be useful to relate the underlying breakage mechanism to the actual failure mode under study. For instance, crushing is a result of tensile failure, even under macroscopic triaxial compression, because many micro-cracks and flaws can exist in rocks, and the crack tips act as stress concentrators where the microscopic tensile stresses develop, which, once exceeding the local tensile strength of the material, drive the micro-cracks to grow into the macroscopic crushing failure.

Cutting velocity can preferentially affect a vertical component of the cutting force (i.e., a thrust force). An explicit dependence on the cutting velocity is shown in the following empirical force model, $$F = F(V, DOC, rock, cutter\ geometry), \quad (3)$$

where V is the cutting velocity. A high velocity (e.g., ROP) increases the rock strength and decreases the friction coefficient. When these two effects are combined, a natural explanation is provided why the thrust force is affected more by the cutting speed than its drag component, and thus can avoid the empirical fitting of the velocity influence.

Figure 3A:
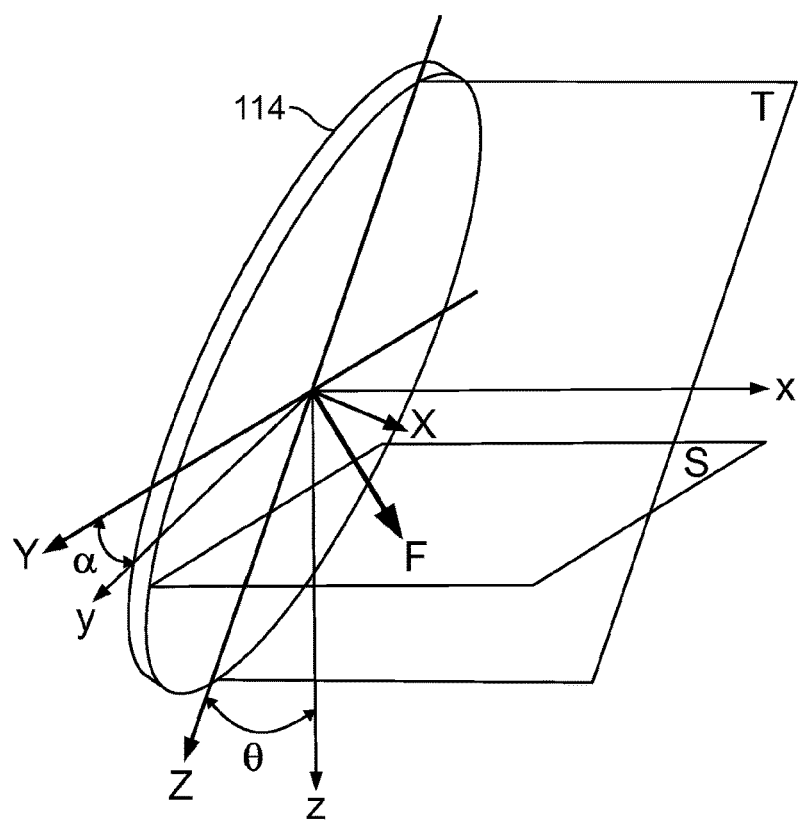
FIGS. 3A and 3B are schematic views of a cutter surface during Earth formation crushing.

FIG. 3A is a schematic diagram of a cutter surface 114, such as the surface of the cutter 112 of FIG. 2, during crushing of rock. FIG. 3A shows cutter geometry, cutter orientation, a fixed reference coordinate system XYZ associated with the cutter surface 114 with the X-axis pointing to the normal direction, and a global coordinate system xyz chosen with the x-axis pointing to the velocity direction, the z-axis being perpendicular to the rock top surface plane S, and the y-axis as the side direction. The global coordinate system xyz includes the mutually perpendicular axes used in the Earth formation crushing model. In FIG. 3A, the back and side rake angles are $\theta$ and $\alpha$, respectively. A circular cutter surface is used as illustration purpose, but the shape of the cutter surface 114 can be different (e.g., rectangular, elliptical, triangular, wear-flat cutter shape, and/or another shape).

In the crushing model, the stress distribution at the cutter surface 114 is important, for example, because the higher the minimum/maximum principal stress, the higher the rock strength, and hence the stronger resistance the rock poses to the cutter. The stress field at the cutter surface 114 is unknown, and when rock is crushed by the cutter surface 114, the rock is subjected to compression from the cutter surface 114 in both the normal direction to the rock surface and the horizontal direction along a cutting velocity. A crushed zone can represent a region of triaxial compression.

From many single cutter experiments, the vertical force $F_z$ (normal to the surface of the cut) and the horizontal force $F_x$ (parallel to the cut) are close to the same magnitude in value, and the projected area subjected to the vertical force can be 3 to 4 times smaller than that subjected to the horizontal force. Consequently, the vertical stress ($\sigma_z$) can be several times larger than the horizontal stress ($\sigma_x$). Some experiments also show that a groove profile of the cutter surface 114 does not extend laterally outside the width of the cutter surface 114, for example, even in coarse-grained rocks, the profile of a cut closely matches that of the cutter surface 114 itself. Hence, it is safe to assume that the lateral strain $\varepsilon_y = 0$. Hooke's law relates the stress components to the lateral strain, $$\varepsilon_y = \frac{1}{E}[\sigma_y - v(\sigma_z + \sigma_x)]. \quad (4)$$

Hence, $$\sigma_y = v(\sigma_z + \sigma_x). \quad (5)$$

The lateral stress $\sigma_y$ is the intermediate stress, because $0 < v \leq 0.5$. Furthermore, the horizontal stress $\sigma_x$ is the minimum stress. In the crushing zone, no shear deformation or shear stress can become dominant. Therefore, the vertical stress $\sigma_z$ is the maximum, principal stress, and the horizontal stress $\sigma_x$ is the minimum principal stress.

In some instances, mud pressure $p_m$ and pore pressure $p_o$ affect compressive stress at the cutter front. Increasing the mud pressure may have the effect of adding to the compressive stress and increasing the pore pressure may have the effect of reducing the effective stress. It is the effective stresses that actually enter the failure criteria of rock. This is also in accordance with the general observation that rock strength increases with the differential pressure $p_m - p_o$. The instantaneous pore pressure at the cutter front affects the effective stress. The instantaneous pore pressure depends on the Earth formation characteristics, for example, the rock virgin pressure, the confining pressure, rock permeability, rock porosity, and/or shearing dilatancy. The confining pressure may affect the MSE of rock differently based on rock permeability.

In determining the stress in crushing, the vertical stress $\sigma_z$ is the maximum principal stress, the horizontal stress $\sigma_x$ is the minimum principal, and $\sigma_y$ is the intermediate principal stress $\sigma_y = v(\sigma_z + \sigma_x)$. The differential pressure $p_m - p_o$ can modify the compressive stress in an additive manner.

The vertical stress level at the cutter front is parameterized by $\sigma_z = \xi q$, where q denotes the UCS of the rock. The effective vertical stress can be defined as $$\sigma_z = \xi q + p_m - p_o. \quad (6)$$

The stress intensity factor $\xi$ determines the compressive stress level in the z-direction (e.g., vertical direction). The stress intensity factor $\xi$ is affected by the Earth formation characteristic (e.g., the rock type) and the cutter characteristic (e.g., the DOC, the WOB, the back angle $\theta$, the cutter sharpness or dullness, cutter shape, cutter geometry, cutter material, and/or cutter orientation).

A determination for stress in the x-direction is determined by the Griffin's criterion as $$\sigma_x = (\sigma_z - q)(\sqrt{1+f^2} - f)^2, \quad (7)$$

where $f = \tan \varphi$, and $\varphi$ is the rock internal friction angle. However, another failure criterion or first principle relationship that bridges minimum and maximum principal stresses can be used in the place of the above equation for stress in the x-direction.

A contact stress $\sigma_c$ at the cutter/rock interface is equal to the normal stress at the rock plane (e.g., Earth formation) in contact with the cutter, i.e., $\sigma_c = \sigma_n$, where the subscript n refers to the normal direction to the rock plane inclined at the same orientation angles as that of the cutter. The normal direction to the cutter is given as $$n = \{\cos \theta \cos \alpha, \cos \theta \sin \alpha, \sin \theta\}. \quad (8)$$

Hence, $$\sigma_c = \sigma_n = \sigma_x(\cos \theta \cos \alpha)^2 + \sigma_y(\cos \theta \sin \alpha)^2 + \sigma_z(\sin \theta)^2. \quad (9)$$

The normal cutting force is given by equation (1) as:

$$F_n = q A_c[(\sqrt{1+f^2} - f)^2(\xi - 1)\cos^2\alpha \cos^2\theta + v((\sqrt{1+f^2} - f)^2(\xi - 1) + \xi)\sin^2\alpha \cos^2\theta + \xi \sin^2\theta] + (p_m - p_o) A_c[(\sqrt{1+f^2} - f)^2 \cos^2\alpha \cos^2\theta + 2v(1+f^2 - f\sqrt{1+f^2})\sin^2\alpha \cos^2\theta + \sin^2\theta] \quad (10)$$

In certain instances, for zero side angle, the Poisson's ratio does not affect the result since $\sin \alpha = 0$. For a very small side angle $\alpha$, the effect of the Poisson's ratio is small, since $\sin \alpha$ is very small. For example, when $\alpha = 10°$, $\sin^2 \alpha = 0.03$, so the contribution from the side stress is negligibly small.

The friction force on the cutter plane is given by $$F_s = \mu F_n, \quad (11)$$

where $\mu$ is the friction coefficient at the rock/cutter interface. The friction coefficient depends on the rock type, the fluid, the DOC, the sliding velocity of the cutting along the cutter face, and/or other factors.

Figure 3B:
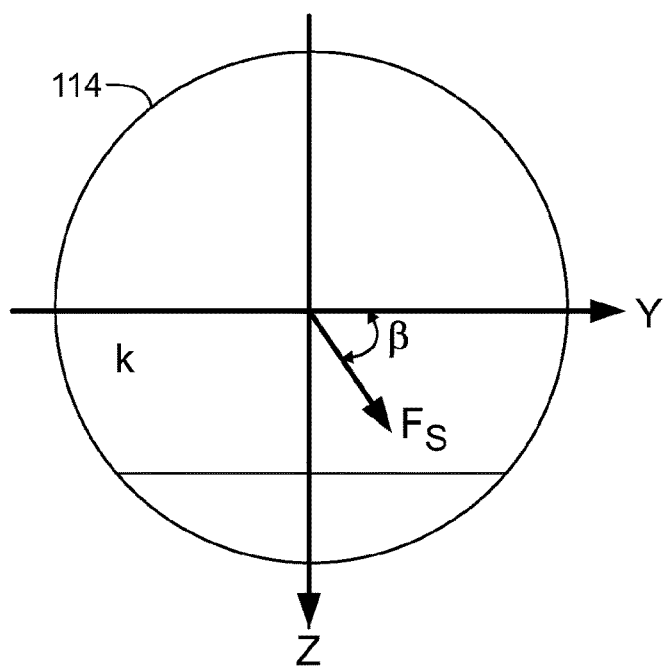

Equation (11) only gives the magnitude of the friction force. The direction of the friction force may be influenced by the direction of the relative sliding velocity of rock on the cutter face, which is determined by the side angle $\alpha$ of the cutter. An angle, $\beta$, is defined with respect to the Y-axis of FIG. 3A. For a zero or a positive side angle $\alpha$, $0 \leq \beta < \pi/2$, the direction of the friction force, as shown in FIG. 3B, can be written as $$k = \{-\cos \beta \sin \alpha - \cos \alpha \sin \beta \sin \theta, \cos \alpha \cos \beta - \sin \alpha \sin \beta \sin \theta, \cos \theta \sin \beta\}. \quad (12)$$

Decomposing $F_n$ and $F_s$ into the global xyz coordinate system results in the following equations:

$$F_x = F_n \cos \theta \cos \alpha - F_s(\cos \beta \sin \alpha + \cos \alpha \sin \beta \sin \theta), \quad (13)$$

$$F_y = F_n \cos \theta \sin \alpha + F_s(\cos \alpha \cos \beta - \sin \alpha \sin \beta \sin \theta), \quad (14)$$

$$F_z = F_n \sin \theta + F_s \cos \theta \sin \beta. \quad (15)$$

An explicit formula for the specific energy $\varepsilon$ can be derived, for example, by substituting equations (1) and (11) into (13):

$$\varepsilon = F_x/A_c = q[(\sqrt{1+f^2} - f)^2(\xi - 1)\cos^2\alpha \cos^2\theta + v((\sqrt{1+f^2} - f)^2(\xi - 1) + \xi)\sin^2\alpha \cos^2\theta + \xi \sin^2\theta][\cos \theta \cos \alpha - \mu(\cos \beta \sin \alpha + \cos \alpha \sin \beta \sin \theta)] + (p_m - p_o)[(\sqrt{1+f^2} - f)^2 \cos^2\alpha \cos^2\theta + 2v(1+f^2 - f\sqrt{1+f^2})\sin^2\alpha \cos^2\theta + \sin^2\theta][\cos \theta \cos \alpha - \mu(\cos \beta \sin \alpha + \cos \alpha \sin \beta \sin \theta)]. \quad (16)$$

The specific energy, $\varepsilon$, is affected by the rock strength and internal friction angle, the back angle $\theta$ and side angle $\alpha$, the differential pressure, the vertical stress intensity factor $\xi$, and/or the friction coefficient between cutter/rock. The vertical stress intensity factor $\xi$ may be affected by the WOB, the DOC, the shape of the cutter, the dullness/sharpness of the cutter, and/or other factors.

When $p_m - p_o = 0$, the specific energy $\varepsilon$ is proportional to q, the unconfined compressive strength (UCS) of rock. In some instances, such as in the specific energy model of Detournay shown in equation 2, for cutters with a back rake angle $\theta$ and side rake angle $\alpha$ equal to zero, the friction coefficient $\mu$ is taken as a constant and set to $\tan(\varphi)$, and $\varepsilon$ is taken as a material constant, regardless the DOC (i.e., for most shallow DOC). In many instances, unless the stress intensity factor $\xi$ and the friction coefficient $\mu$ do not change with the DOC, $\varepsilon$ cannot be a constant, and the stress intensity factor $\xi$ and the friction coefficient $\mu$ cannot be simultaneously taken as constants from the results of single cutter tests (described below). In instances when both $\xi$ and $\mu$ change only slightly with the DOC, the intrinsic specific energy can be estimated, for example, from a scratch test. The differential pressure $p_m - p_o$ contributes additively to the specific energy $\varepsilon$.

The cutting velocity affects preferentially the z-component (e.g., vertical component) of the cutting force. The vertical force can be expressed as $$F_z/A_c = q[(\sqrt{1+f^2}-f)^2(\xi-1)\cos^2\alpha \cos^2\theta + v((\sqrt{1+f^2}-f)^2(\xi-1)+\xi)\sin^2\alpha \cos^2\theta + \xi \sin^2\theta][\sin\theta + \mu \cos\theta \sin\beta] + (p_m - p_o)[(\sqrt{1+f^2}-f)^2 \cos^2\alpha \cos^2\theta + 2v(1+f^2 - f\sqrt{1+f^2})\sin^2\alpha \cos^2\theta + \sin^2\theta][\sin\theta + \mu \cos\theta \sin\beta]. \quad (17)$$

Figure 4A:
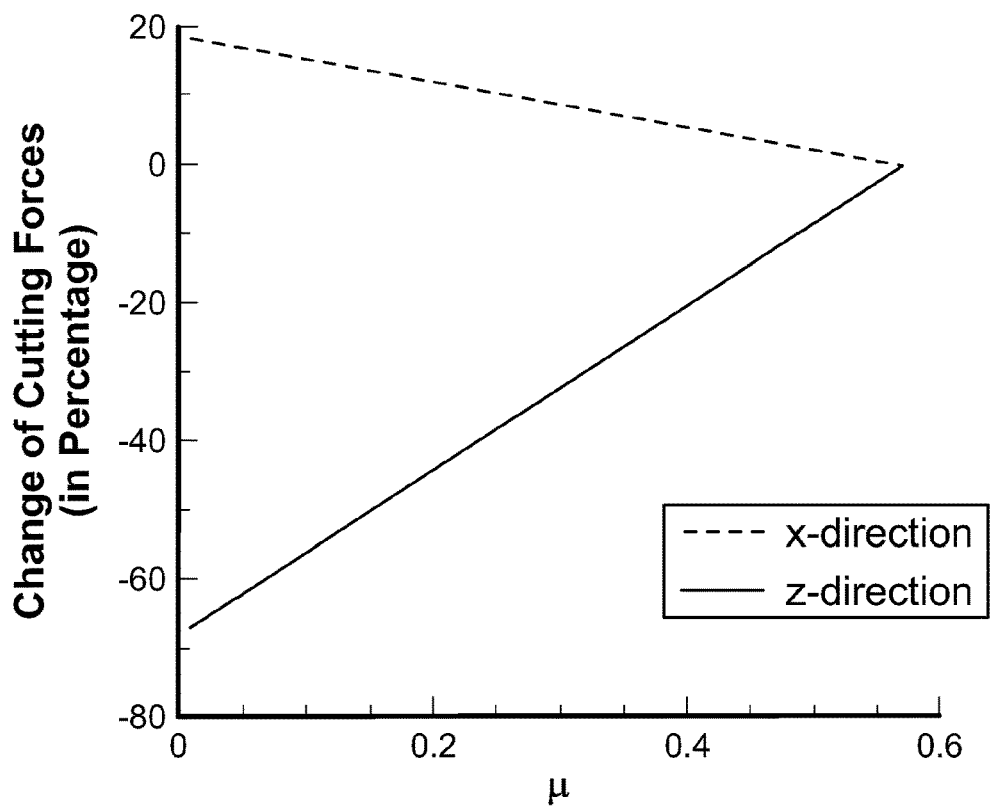
FIG. 4A is a plot of a numerical example of cutting force change over a friction coefficient range.

Many single cutter experiments were performed under atmospheric conditions, with zero side angle $\alpha$, and a small back angle $\theta$. These conditions can be mimicked by setting $p_m - p_o = 0$, $\alpha = 0$, and $\beta = \pi/2$. Hence, the change of cutting forces can be expressed as $$(F_x' - F_x)/F_x = \frac{(\mu_s - \mu')\tan\theta}{1 - \mu_s \tan\theta}, \quad (18)$$

$$\text{and } (F_z' - F_z)/F_z = \frac{\mu' - \mu_s}{\mu_s + \tan\theta},$$

where the superscript ' indicates the cutting forces and friction coefficient at a higher velocity, and where $F_x$ and $\mu_s$ represents the static cutting force and static friction coefficient. By static, we mean the ideal case when the cutter moves slowly. In general cases, the dynamic friction coefficient can be expressed as $$\mu' = \mu_k + (\mu_s - \mu_k)e^{-c\dot{\gamma}}, \quad (19)$$

where $\mu_s$ is the static friction coefficient, $\mu_k$ is the kinetic friction coefficient, c is a user determined decay coefficient, and $\dot{\gamma}$ is the slip rate. Typically, $\mu_s > \mu_k$. With increasing slip rates, the dynamic friction coefficient drops exponentially from $\mu_s$ to $\mu_k$. Setting $\mu$ to $\tan(\varphi)$ represents the maximum possible friction coefficient, i.e., $\mu_s = \mu_k = \tan(\varphi)$, since the interfacial friction angle between the cutter and Earth formation cannot exceed the internal friction angle of the rock, even under dry conditions. FIG. 4A is a plot showing, assuming $\theta = \pi/12$, $\mu_s = \tan(\varphi)$, and $\varphi = \pi/6$ for a sandstone, a numerical example of the force changes with $\mu'$. The z-direction (i.e., vertical) force change, in percentage, nearly triples that of the horizontal force. Therefore, increasing the cutting velocity affects preferentially the z-direction, or vertical, cutting force.

Referring back to FIG. 3A, the force inclination angle $\psi_n$ is the angle between the projection of F and the projection of n (along the X-axis) onto the plane T, which is defined as follows:

$$\cos\psi_n = \frac{F_x/F_z \cos\theta\cos\alpha + \sin\theta}{\sqrt{1 + F_x^2/F_z^2}\sqrt{\cos^2\alpha \cos^2\theta + \sin^2\theta}} \quad (20)$$

In instances of single cutter testing under the atmospheric conditions with $\alpha = 0$ and $\beta = \pi/2$, the drag cutter coefficient can be derived as $$K_d = F_x/F_z = \frac{1 - \mu\tan\theta}{\mu + \tan\theta} \quad (21)$$

The inclination angle is directly related to the side angle $\alpha$ and back angle $\theta$, and the cutter drag coefficient, which is in turn related to the interfacial friction coefficient for the special case seen in many single cutter tests. The friction coefficient may be affected by the rock type, the DOC, the back angle $\theta$ and side angle $\alpha$, the cutting velocity, and/or other factors.

Using equations (13-15) as a predictive tool includes supplying $\xi$, $\mu$, and $\beta$. Although this 3D model is, in part, based on the first principles of mechanics, the model parameters are not derivable solely from the first principles. Hence, empirical (e.g., experimental) measurements for $\xi$, $\mu$, and $\beta$ are implemented. From the single cutter experiments for a test setting, three force components $F_x$, $F_y$, and $F_z$ are measured, then, $\xi$, $\mu$, and $\beta$ are solved by fitting the model forces from equations (13-15) to the experimental data. It is a nonlinear system of three equations with three unknowns. In some instances where the side angle $\alpha$ is zero, $\beta = \pi/2$ if the side force $F_y$ is negligibly small. Then, equation (13) and (15) become a linear system of equations in terms of $\xi$ and $\mu$, which can simplify the solution process. From single cutter experiments, a database of $\xi$, $\mu$, and $\beta$ can be generated for a discrete set of cutter characteristics (e.g., cutter geometries, cutting parameters) and Earth formation characteristics (e.g., rock type). The data in the database can be utilized for another test setting, for example, by interpolating $\xi$, $\mu$, and/or $\beta$. This database can offer the confidence of both analytical (i.e., theoretical) and empirical (i.e., experimental) support. In some instances, the influence of one parameter may be found to be minor, constant, or linear and, for example, can be used to simplify the design of experiments and/or design of an Earth drill bit. In certain instances, the crushing model outputs the determined cutting forces for the Earth formation, a rate of penetration of the Earth drill bit, a cutting speed of the Earth drill bit, and/or another cutting characteristic. For example, the single cutter forces can be predicted based on the crushing model using the database. For an entire Earth formation drill bit, forces on each single cutter can be predicted using the crushing model and combined (e.g., summed together) to determine a drilling force for the entire Earth formation drill bit. In some instances, the crushing model is used to construct, design, and/or otherwise produce an Earth formation drill bit based on the outputted cutting characteristic. For example, the cutting characteristic can be used to select a material, geometry, orientation, and/or other characteristic of a single cutter of the drill bit, or of multiple cutters of the drill bit.

Figure 4B:
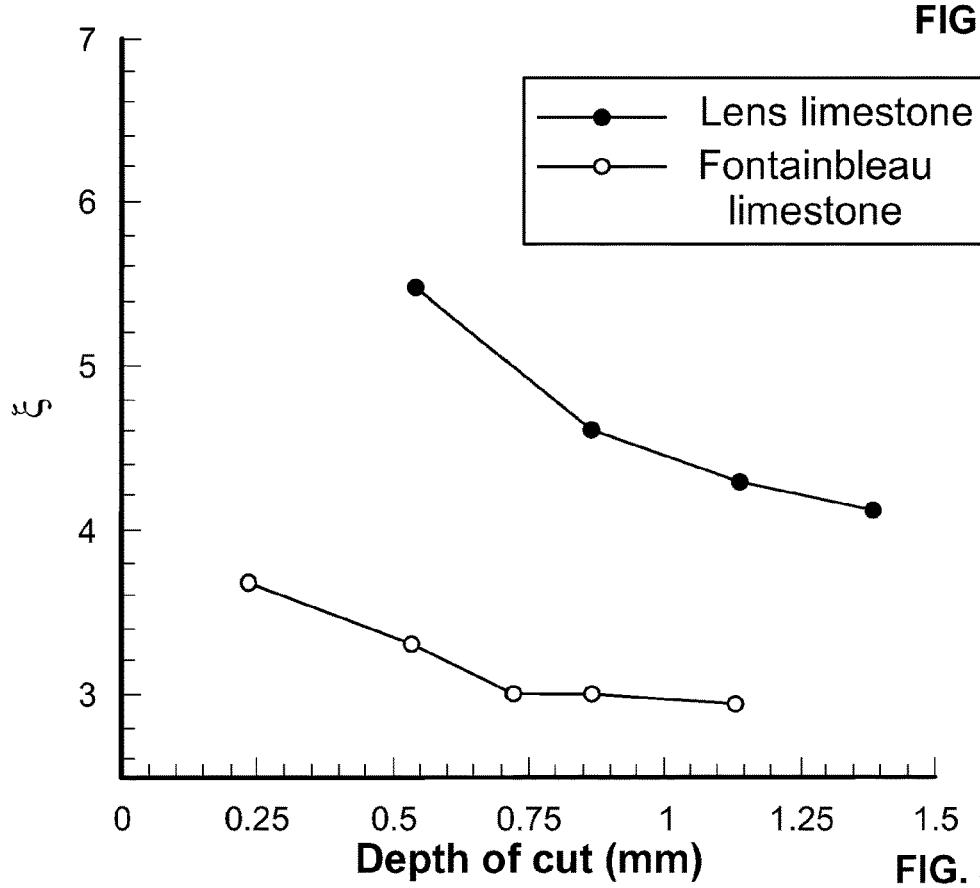
FIG. 4B is a plot of a numerical example of stress intensity factors over a range of depths of cut for two example limestone types.

In a first example, experimental data of Lens limestone (q=30, $\varphi$=38.4) is analyzed and subjected to a circular cutter of R=6.5 mm with $\theta = \pi/12$, and $\alpha = 0$. Horizontal cutting forces at several DOCs are extracted from experimental data. The vertical force is back-analyzed by using the force inclination angle, which is nearly a constant and taken as $\psi_n = 23.2°$. The stress intensity factor in this example is shown in FIG. 4B. For comparison, the stress intensity factor for the Fontainebleau limestone (q=90, $\varphi$=30) is also shown in FIG. 4B. The Lens limestone experiences more compression at the same depth of cut than Fontainebleau limestone. In both rock types, the stress intensity factor drops slightly with increasing depth of cut, and approximately in an exponential manner.

In another example, single cutter experiments are conducted on various rock types (e.g., Redwildmoor, Anstrude, Vosges, Buxy, Fontainebleau, and Rhune) with a sharp rectangular PDC cutter of width 10 mm. The associated angles are $\theta = \pi/12$, and $\alpha = 0$. The vertical and horizontal force data are taken from experimental data. The depths of cut of these tests are all shallow. The UCS and the internal friction angle of the various rock types are given in Table 1. The internal friction angles are extracted from provided data, experimental data, or assumed to be 31°.

TABLE 1

The UCS and internal friction angle for rock types

| Rock Type | q (MPa) | φ |
|---|---|---|
| Redwildmoor | 13 | 41 |
| Anstrude | 39 | 31 |
| Vosges | 42 | 34 |
| Buxy | 78 | 35 |
| Fontainebleau | 110 | 41.3 |
| Rhune | 110 | 31 |

Figure 4C:
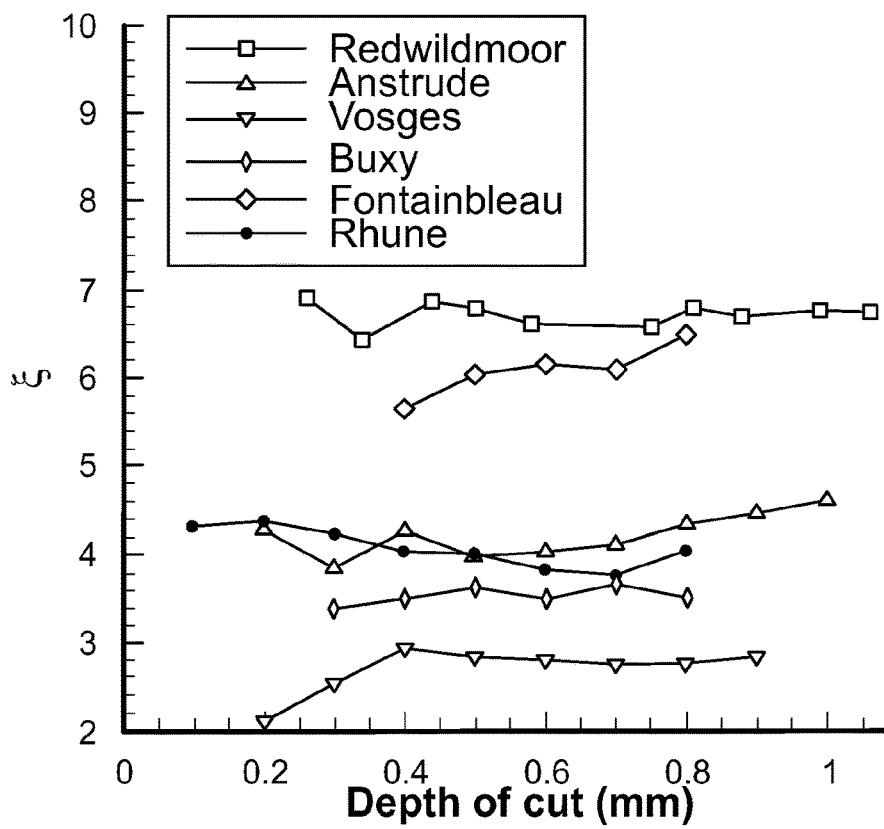
FIG. 4C is a plot of a numerical example of stress intensity factors over a range of depths of cut for several example rock types.

The calculated stress intensity factors ξ for the various rock types at different depth of cut are shown in FIG. 4C. ξ remains nearly constant for each of the rock types up to the maximum of DOC of 1.1 mm. Comparing against that for the circular cutter in the first example, in which case ξ drops nearly exponentially, the shape of the cutter can affect the stress intensity factor. The calculated ξ for each rock cannot be correlated to the rock UCS. However, ξ may be loosely correlated to the internal friction angle of rock. For example, the Anstrude limestone and Rhune sandstone differ greatly in the UCS, but their φ values are the same and their calculated ξ's are relatively close; similar observations apply to the Redwildmoor and the Fontainebleau sandstones.

In some instances, for a rectangular cutter against all rock types, μ drops almost linearly or exponentially with increasing DOC. The calculated μ's are bounded in the range between $\tan(\theta)$ and $\tan(\varphi)$. However, μ can be much smaller than $\tan(\varphi)$ that is sometimes taken as the friction coefficient in the field.

Figure 4D:
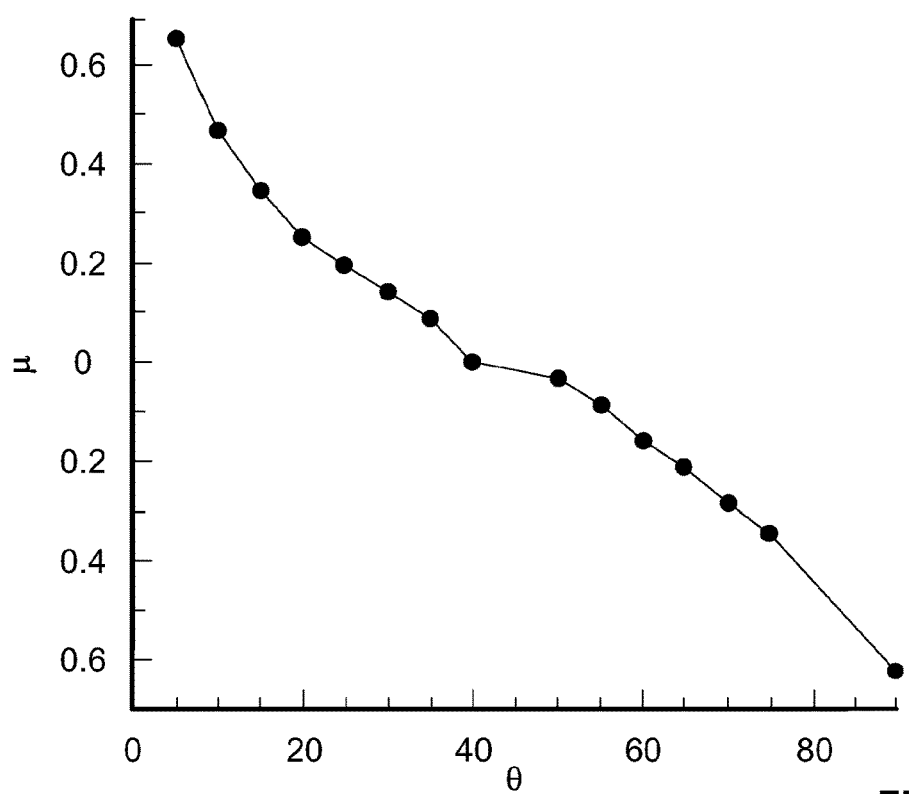
FIG. 4D is a plot of a numerical example of a friction coefficient over a range of back rake angles.

In some instances, the force inclination angle $\psi_n$ decreases with increasing back angle θ. Taking given values of $\psi_n$ averaged over the DOC from 0.1 to 1 mm, a back-analysis of the friction coefficient using equations (19) and (20) shows the results depicted in FIG. 4D. The friction coefficient decreases almost in a linear way with the back angle θ. For example, for very large back angles θ, the friction coefficient becomes negative, meaning that the rock changes the direction of the plastic flow from the upwards to the downwards.

In some implementations, a single cutter crushing model is based on analyzing experimental cutting force data upon which the order of principal stresses are determined and rock failure criterion are enforced. Further, the theoretical cutting forces can be derived based on a crushing state of the stresses at the cutter front according to the basic principles of continuum mechanics. The parameters of the model can obtained by matching the theoretical cutting forces with the experimental cutting force data, forming the basis for single cutter force predictions. For example, an example single cutter crushing model includes the steps of assuming a stress state by parameterizing its components based on experimental observations, enforcing rock failure criterion onto the assumed stress state, integrating the assumed stresses over the cutter face (or shear face during chipping) to calculate the cutting forces, solving the parameters (e.g., ξ, μ, and β) in the assumed stress state by matching the calculated cutting forces against the experimental cutting forces (e.g., $F_x = \overline{F}_x$, $F_y = \overline{F}_y$, and $F_z = \overline{F}_z$), and extending the assumed stress state by parameter interpolation.

Figure 5:
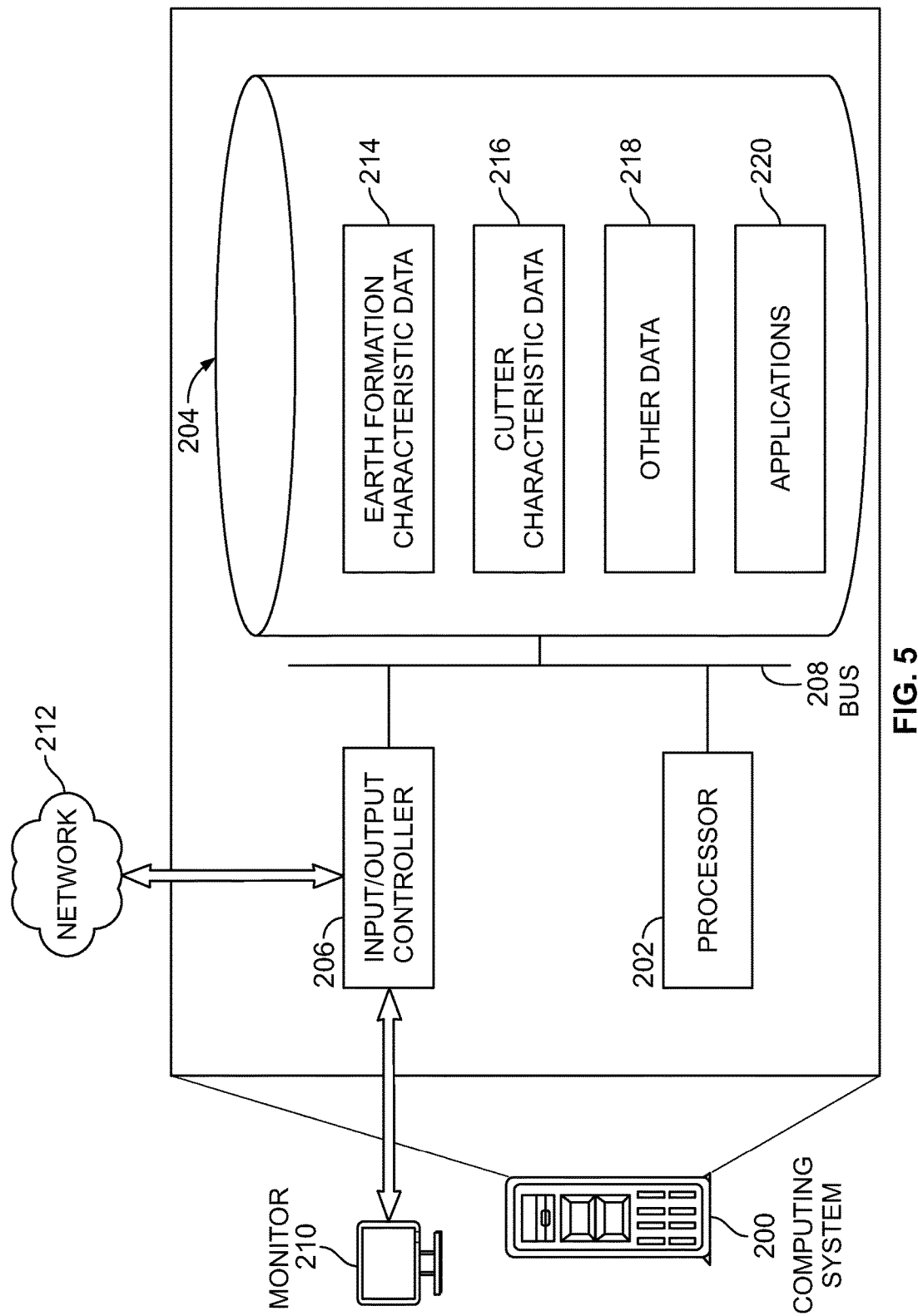
FIG. 5 illustrates an example architecture of an example computing system.

FIG. 5 illustrates an example architecture of an example computing system 200 (e.g., computer) that can implement operations of the example single cutter crushing model described above. The example computing system 200 can be located at or near a single cutter testing facility. The example computing system 200 includes one or more processors 202, a computer-readable medium 204 (e.g., a memory), and input/output controllers 206 communicably coupled by a bus 208. The computer-readable medium 204 can include, for example, a random access memory (RAM), a storage device (e.g., a writable read-only memory (ROM) and/or others), a hard disk, and/or another type of storage medium. The computer-readable medium 204 can include readable and/or editable data including Earth formation characteristic data 214, cutter characteristic data 216, application data 220, and/or other data 218. The computing system 200 can be preprogrammed and/or it can be programmed (and reprogrammed) by loading a program from another source (e.g., from a CD-ROM, from another computing device through a data network, and/or in another manner). The input/output controller 206 is coupled to input/output devices (e.g., monitor 210) and to a network 212. The input/output devices receive and transmit data in analog or digital form over communication links such as a serial link, wireless link (e.g., infrared, radio frequency, and/or others), parallel link, and/or another type of link.

The network 212 can include any type of data communication network. For example, the network 212 can include a wireless and/or a wired network, a Local Area Network (LAN), a Wide Area Network (WAN), a private network, a public network (such as the Internet), a WiFi network, a network that includes a satellite link, and/or another type of data communication network.

Figure 6:
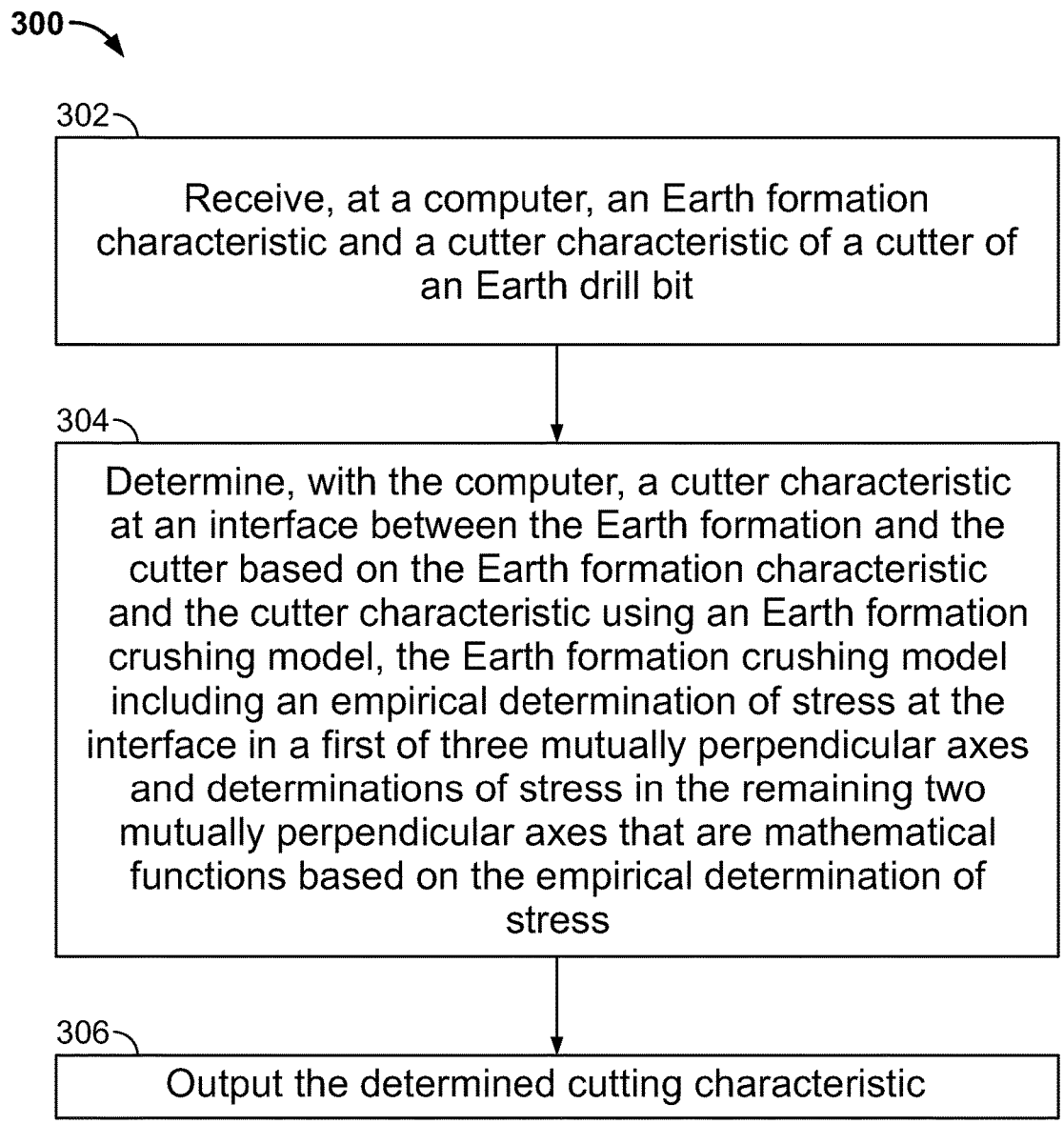
FIG. 6 is a flowchart describing an example process for determining an Earth drill bit cutting characteristic.

FIG. 6 is a flowchart describing an example process 300 for determining an Earth drill bit cutting characteristic, for example, performed by the example computing system 200 of FIG. 5. At 302, an Earth formation characteristic and a cutter characteristic of a cutter of an Earth drill bit are received at a computer. At 304, a cutter characteristic at an interface between the Earth formation and the cutter is determined, with the computer, based on the Earth formation characteristic and the cutter characteristic using an Earth formation crushing model. The Earth formation crushing model includes an empirical determination of stress at the interface in a first of three mutually perpendicular axes and determinations of stress in the remaining two mutually perpendicular axes that are mathematical functions based on the empirical determination of stress. At 306, the determined cutting characteristic is outputted.

In view of the discussion above, certain aspects encompass a method including receiving, at a computer, an Earth formation characteristic and a cutter characteristic of a cutter of an Earth drill bit and determining, with the computer, a cutting characteristic at an interface between the Earth formation and the cutter based on the Earth formation characteristic and the cutter characteristic using an Earth formation crushing model operating on the computer. The Earth formation crushing model includes an empirical determination of stress at the interface in a first of three mutually perpendicular axes and determinations of stress in the remaining two mutually perpendicular axes that are mathematical functions based on the empirical determination of stress. The method also includes outputting the determined cutting characteristic.

Certain aspects encompass a non-transitory, computer-readable medium storing instructions operable when executed to cause at least one processor to perform operations including receiving an Earth formation characteristic and a cutter characteristic of a cutter of an Earth drill bit, determining a cutting characteristic at an interface between the Earth formation and the cutter based on the Earth formation characteristic and the cutter characteristic using an Earth formation crushing model, and outputting the determined cutting characteristic. The Earth formation crushing model includes an empirical determination of stress at the interface in a first of three mutually perpendicular axes and determinations of stress in the remaining two mutually perpendicular axes that are mathematical functions based on the empirical determination of stress.

Certain aspects encompass a system including memory for storing data and one or more processors operable to perform operations including receiving an Earth formation characteristic and a cutter characteristic of a cutter of an Earth drill bit, determining a cutting characteristic at an interface between the Earth formation and the cutter based on the Earth formation characteristic and the cutter characteristic using an Earth formation crushing model, and outputting the determined cutting characteristic. The Earth formation crushing model includes an empirical determination of stress at the interface in a first of three mutually perpendicular axes and determinations of stress in the remaining two mutually perpendicular axes that are mathematical functions based on the empirical determination of stress.

The aspects above can include some, none, or all of the following features. The empirical determination of stress is based on an empirically determined stress intensity factor and an unconfined compressive strength of the Earth formation. The determinations of stress in the remaining two mutually perpendicular axes are first principle relationships between the stress in the first axis and the stresses in the remaining two axes. The first axis is in a z-direction perpendicular to a surface of the Earth formation at the interface between the Earth formation and the cutter. The empirically determined stress intensity factor represents a stress level in the z-direction. The first axis in the z-direction intersects a face of the cutter. The crushing model includes experimentally measured cutting forces in each of the three mutually perpendicular axes to determine the stress intensity factor, and the method includes storing the stress intensity factor in a database of stress intensity factors based on the Earth formation characteristic and the cutter characteristic. Outputting the determined cutting characteristic includes outputting at least one of cutting forces for the Earth formation, a rate of penetration of the Earth drill bit, or a cutting speed of the Earth drill bit. The method includes producing an Earth drill bit based on the determined cutting characteristic. Determining a cutting characteristic at an interface between the Earth formation and the cutter includes determining the empirical determination of stress in the first of three mutually perpendicular axes at the interface, determining the stress at the interface in the remaining two mutually perpendicular axes as a function of the empirical determination of stress in the first of three mutually perpendicular axes, determining cutting forces at the interface in each of the three mutually perpendicular axes as a function of the determined stress at the interface in each of the three mutually perpendicular axes, and determining the cutting characteristic by matching the determined cutting forces against experimental cutting forces and solving for the cutting characteristic. The operations include producing an Earth drill bit design based on the determined cutting characteristic.

A number of embodiments have been described. Nevertheless, it will be understood that various modifications may be. Accordingly, other embodiments are within the scope of the following claims.

What is claimed is:

1. A method, comprising:
   receiving, at a computer, an Earth formation characteristic and a cutter characteristic of a cutter of an Earth drill bit;
   determining, with the computer, a cutting characteristic at an interface between the Earth formation and the cutter based on the Earth formation characteristic and the cutter characteristic using an Earth formation crushing model operating on the computer, where determining the cutting characteristic at the interface between the Earth formation and the cutter comprises:
   determining an empirical determination of stress in a first of three mutually perpendicular axes at the interface;
   determining a stress at the interface in a remaining two mutually perpendicular axes as a function of the empirical determination of stress in the first of three mutually perpendicular axes;
   determining cutting forces at the interface in each of the three mutually perpendicular axes as a function of the determined stress at the interface in each of the three mutually perpendicular axes; and
   determining the cutting characteristic by matching the determined cutting forces against experimental cutting forces and solving for the cutting characteristic; and
   outputting the determined cutting characteristic.

2. The method of claim 1, where the empirical determination of stress is based on an empirically determined stress intensity factor and an unconfined compressive strength of the Earth formation.

3. The method of claim 2, where the determinations of stress in the remaining two mutually perpendicular axes are first principle relationships between the stress in the first axis and the stresses in the remaining two axes.

4. The method of claim 2, where the first axis is in a z-direction perpendicular to a surface of the Earth formation at the interface between the Earth formation and the cutter.

5. The method of claim 4, where the empirically determined stress intensity factor represents a stress level in the z-direction.

6. The method of claim 4, where the first axis in the z-direction intersects a face of the cutter.

7. The method of claim 2, the crushing model comprising experimentally measured cutting forces in each of the three mutually perpendicular axes to determine the stress intensity factor; and
   the method comprising storing the stress intensity factor in a database of stress intensity factors based on the Earth formation characteristic and the cutter characteristic.

8. The method of claim 1, where outputting the determined cutting characteristic comprises outputting at least one of cutting forces for the Earth formation, a rate of penetration of the Earth drill bit, or a cutting speed of the Earth drill bit.

9. The method of claim 1, comprising producing an Earth drill bit based on the determined cutting characteristic.

10. A non-transitory, computer-readable medium storing instructions operable when executed to cause at least one processor to perform operations comprising:

receiving an Earth formation characteristic and a cutter characteristic of a cutter of an Earth drill bit;

determining a cutting characteristic at an interface between the Earth formation and the cutter based on the Earth formation characteristic and the cutter characteristic using an Earth formation crushing model, where determining the cutting characteristic at the interface between the Earth formation and the cutter comprises:

determining an empirical determination of stress in a first of three mutually perpendicular axes at the interface;

determining the stress at the interface in a remaining two mutually perpendicular axes as a function of the empirical determination of stress in the first of three mutually perpendicular axes;

determining cutting forces at the interface in each of the three mutually perpendicular axes as a function of the determined stress at the interface in each of the three mutually perpendicular axes; and determining the cutting characteristic by matching the determined cutting forces against experimental cutting forces and solving for the cutting characteristic; and outputting the determined cutting characteristic.

11. The non-transitory, computer-readable medium of claim 10, where the empirical determination of stress is based on an empirically determined stress intensity factor and an unconfined compressive strength of the Earth formation.

12. The non-transitory, computer-readable medium of claim 11, where the determinations of stress in the remaining two mutually perpendicular axes are first principle relationships between the stress in the first axis and the stresses in the remaining two axes.

13. The non-transitory, computer-readable medium of claim 10, the operations comprising producing an Earth drill bit design based on the determined cutting characteristic.

14. A system comprising:
memory for storing data; and
one or more processors operable to perform operations comprising:

receiving an Earth formation characteristic and a cutter characteristic of a cutter of an Earth drill bit;

determining a cutting characteristic at an interface between the Earth formation and the cutter based on the Earth formation characteristic and the cutter characteristic using an Earth formation crushing model, where determining the cutting characteristic at the interface between the Earth formation and the cutter comprises:

determining an empirical determination of stress in a first of three mutually perpendicular axes at the interface;

determining the stress at the interface in a remaining two mutually perpendicular axes as a function of the empirical determination of stress in the first of three mutually perpendicular axes;

determining cutting forces at the interface in each of the three mutually perpendicular axes as a function of the determined stress at the interface in each of the three mutually perpendicular axes; and determining the cutting characteristic by matching the determined cutting forces against experimental cutting forces and solving for the cutting characteristic; and outputting the determined cutting characteristic.

15. The system of claim 14, where the empirical determination of stress is based on an empirically determined stress intensity factor and an unconfined compressive strength of the Earth formation.

16. The system of claim 15, where the determinations of stress in the remaining two mutually perpendicular axes are first principle relationships between the stress in the first axis and the stresses in the remaining two axes.

17. The system of claim 14, the operations comprising producing an Earth drill bit design based on the determined cutting characteristic.

* * * * *